United States Patent [19]
Mori et al.

[11] 3,895,070
[45] July 15, 1975

[54] PROCESS FOR THE PREPARATION OF KETONES

[75] Inventors: Yutaka Mori, Kawanishi; Takeo Sakan, Izumisano, both of Japan

[73] Assignees: Suntory Ltd.; Shiono Koryo Kaisha, both of Osaka, Japan

[22] Filed: July 23, 1973

[21] Appl. No.: 381,808

[30] Foreign Application Priority Data
Feb. 27, 1973  Japan.............................. 48-23505

[52] U.S. Cl.............. 260/586 R; 260/590; 260/592; 260/593 R; 260/591
[51] Int. Cl.$^2$........................................ C07C 45/00

[58] Field of Search............ 260/593 R, 592, 287 D, 260/593, 590, 586, 591

[56] References Cited
OTHER PUBLICATIONS
Talanta, 4, 75–79 (1960) Salesin et al.

*Primary Examiner*—Howard T. Mars
*Assistant Examiner*—James H. Reamer
*Attorney, Agent, or Firm*—Flynn & Frishauf

[57] ABSTRACT

A process of producing saturated or unsaturated ketones comprising reaction of 8-acyloxy-quinoline with Grignard reagents.

7 Claims, No Drawings

PROCESS FOR THE PREPARATION OF KETONES

This invention relates to a novel synthetic method for ketones. Various methods are known for the synthesis of ketones. Among them are oxidation of secondary alcohols, Friedel-Crafts reaction, dry distillation of calcium carboxylic acids, reaction of acyl halides with Grignard compounds and each of them has its own characteristics. However, in some cases the yields are poor and in other cases the reactions are specific and the raw materials for the reaction are hard to obtain. Such being the case, no satisfactory methods have been found so far. The synthetic method of this invention is suited for all kinds of ketones especially a ketone which has an unsaturated radical or radicals or a ketone consisting of aliphatic groups and aromatic groups.

The method of this invention uses 8-oxyquinoline which is commercially available at a reasonable cost and is a novel synthetic method for ketones which is characterized by reaction of a 8-acyloxyquinoline with the Grignard reagent. An 8-acyloxyquinoline (1) is obtained by reacting 8-hydroxyquinoline with an acyl halide or anhydrous acid in a conventional method and any acyl radical of an aliphatic group or of aromatic group whether it has an unsaturated radical or not can be used.

Also any Grignard reagents can be used in this reaction so far as the reagents are commonly used as Grignard reagents. The reagents could be used without any modification. It is preferrable to carry out the reaction of a 8-acyloxyquinoline with the Grignard reagent in a solvent at a low temperature. When the chemicals are mixed for reaction, the material specified as (3) hereunder was first formed and the material specified (4) was next formed followed by the precipitation of a material specified as (5). When the reaction was finished, the material (5) was separated by filtration, the filtrate contained (4) was washed, removed of its solvent and refined by such as distillation. Thus, we could get the ketones with ease. The solvents used in this reaction were any one or more of the following materials: ethers such as diethyl ether, tetrahydrofuran, hydrocarbons of aromatic groups such as benzene, toluene, hydrocarbons of aliphatic group such as hexane, cyclo-hexane, or halogenated hydrocarbons such as dichlorethane, more preferably the solvents consisting of a combination of the materials shown hereinabove.

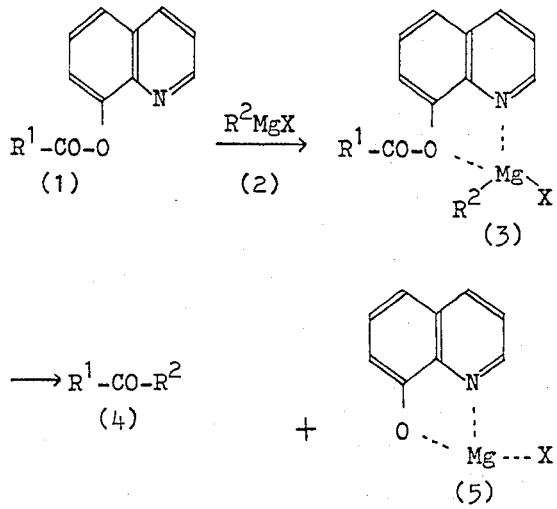

wherein $R^1$, $R^2$ are aliphatic or aromatic saturated or unsaturated hydrocarbon radicals, $R^1$ has 1 to 8 carbon atoms and $R^2$ has 2 to 8 carbon atoms, further, $R^1$ and $R^2$ are either the same or different and X is halogen We have chosen 8-oxyquinoline for this reaction because of its easy acylation and easy formation of an 8-acyloxyquinoline with metallic ions of the five-membered chelate structure as shown (3) hereinabove, further, in this complex, said chelate complex appears to be more reactive to a nucleophilic reagent and 8-oxyquinoline itself has the ability to act as a chelate agent for forming a stable chelate compound as shown in (5). Further, 8-oxyquinoline is easily recovered from this metallic chelate compound by well known methods. Among the ketones obtained by this invention, there are some which have not been published in papers until now, however, all of them can be obtained by a simple process with good yields. These ketones are not only used without any modification as ingredients for compounded flavour materials but also as important intermediates for the synthesis of organic compounds.

The following examples are presented to further illustrate the invention. In the examples, the physical properties or analytical values are omitted if the ketones which are obtained through the procedures are the same as those already known, since the physical properties or values are the same with them.

EXAMPLE 1

Grignard reagent, prepared carefully from 4.0 mM of phenyl bromide and 4.0 mg atom of magnesium in 10 ml absolute ether under oxygen free nitrogen, was added slowly with vigorous stirring to a solution of 3.6 mM of 8-acetoxyquinoline at 0°C during 30 minutes. A white precipitate was immediately formed. The stirring was continued at the same temperature for one hour and then at room temperature (about 25°C) for more one hour. The precipitate of the magnesium complex of 8-hydroxyquinolinate anion was removed by filtration. The filtrate was washed with 2N HCl and water, and dried over sodium sulfate. After removal of the solvent, the acetophenone which had been formed was purified by distillation. The precipitate was decomposed with 6N HCl to further recover acetophenone. The total yield of acetophenone was 64%.

EXAMPLE 2

The same steps and conditions as in Example 1 were followed except that n-hexyl bromide was used in place of phenyl bromide and methyl-hexyl ketone was formed in a yield of 90%.

EXAMPLE 3

The same steps and conditions as in Example 1 were followed except that 2-phenyl-ethyl bromide was used in place of phenyl bromide and methyl-2-phenylethyl ketone with a yield of 90%.

EXAMPLE 4

The same steps and conditions as in Example 1 were followed except that ethyl bromide was used in place of phenyl bromide and that same mole of 8- benzoylquinoline in place of 8-acetoxy-quinoline, and a mixture of 10 ml of ether and 15 ml of tetrahydrofuran in place of 10 ml of absolute ether. Phenyl-ethyl ketone was obtained in a yield of 56%. In the case that a mixture of 10 ml of ether and 15 ml of benzene was used as solvent, the yield was improved to 61%.

EXAMPLE 5

The same steps and conditions as in Example 4 were followed except that phenyl bromide was used in place of ethyl bromide and benzophenone was obtained in a yield of 54% by carrying out recrystallization. In the case that a mixture of ether/benzene was used as solvent, the yield was improved to 82%.

EXAMPLE 6

The same steps and conditions as in Example 4 were followed except that n-hexyl bromide was used in place of ethyl bromide. In the case that a ether/tetrahydrofuran mixture was used as solvent, the yield of phenyl-hexyl ketone was 50% and in the case that a ether/benzene mixture was used as solvent, the yield of said ketone was 75%.

EXAMPLE 7

The same steps and conditions as in Example 4 were followed except that 2-phenyl-ethyl bromide was used in place of ethyl bromide. In the case that a ether/tetrahydrofuran mixed solvent was used, the yield of phenyl-2-ethyl-phenyl ketone was 71% and in the case that a ether/benzene mixed solvent was used, the yield of said ketone was 82%.

EXAMPLE 8

The same steps and conditions as in Example 2 were followed except that n-hexyl chloride was used in place of n-hexyl bromide and that a mixture of tetrahydrofuran/benzene (1:1) was used as solvent and methyl-hexyl ketone was obtained in a yield of 84%.

EXAMPLE 9

The same steps and conditions as in Example 4 were followed except that ethyl iodide was used in place of ethyl bromide and that, after completion of reaction, the filtrate was washed with sodium thiosulfate solution and phenyl-ethyl ketone was obtained in a yield of 89%.

EXAMPLE 10

The same steps and conditions as in Example 1 were followed except that octyl bromide was used in place of phenyl bromide and 2-decanone was obtained in a yield of 94%.

EXAMPLE 11

The same steps and conditions as in Example 1 were followed except that cyclohexyl bromide was used in place of phenyl bromide and that a mixture of ether/tetrahydrofuran (1:1) was used as solvent and cyclohexyl-methyl ketone was obtained in a yield of 85%.

EXAMPLE 12

The same steps and conditions as in Example 1 were followed except that 3-cis-hexenyl bromide was used in place of phenyl bromide and that a mixture of benzene/dichlorpropane (1.5:1) was used as solvent. The filtrate which was obtained by the reaction was washed, dried and passed through the activated carbons, and distilled to get 3-cis-hexenyl-methyl ketone with a yield of 85%.

EXAMPLE 13

The same steps and conditions as in Example 12 were followed except that ω-pentenyl bromide was used in place of 3-cis-hexenyl bromide and ω-pentenyl-methyl ketone was obtained in a yield of 87%.

EXAMPLE 14

The same steps and conditions as in Example 1 were followed except that cinnamyl iodide was used in place of phenyl bromide and that a mixture of ether/benzene (1:1) was used as solvent and cinnamyl-methyl ketone was obtained in a yield of 76%.

EXAMPLE 15

The same steps and conditions as in Example 12 were followed except that 8-caproylquinoline was used in place of 8-acetoxyquinoline and that a mixture of tetrahydrofuran/benzene (2:1) was used as solvent. After completion of reaction, filtrate was removed and extracted with benzene and thereafter followed by the same procedures as taken in Example 12 and a material having a boiling point of 110°–112°C/9 mmHg was obtained. The inventors confirmed this material to be pentyl-3-cis-hexenyl ketone by the elementary analysis, by the value of 1715 cm$^{-1}$ by IR spectral absorption and by the values 0.7–1.7 (14H), 1.7–2.4 (6H) and 5.0–5.4 (2H) of NMR in carbon tetrachloride. The yield of this material was 95%. This material has not previously been reported.

EXAMPLE 16

The same steps and conditions as in Example 15 were followed except that 8-ω-pentenoylquinoline was used in place of 8-caproylquinoline and a material having a boiling point of 115°–117°C/10 mmHg was obtained. The inventors confirmed this material to be ω-pentenyl-3-cis-hexenyl ketone by elementary analysis, by the value of 1715 cm$^{-1}$ by IR spectral absorption and by the values 0.93 (3H), 1.76–2.65 (10H), 4.82–5.10 (2H), 5.25–5.58 (2HO of NMR in carbon tetrachloride. The yield of this material was 50% and this material has not previously been reported.

EXAMPLE 17

The same steps and conditions as in Example 14 were followed except that iso-amylbromide was used in place of cinnamyl iodide and 8-(3)-hexenoyloxyquinoline was used in place of 8-acetoxyquinoline, and isoamyl-3-pentenyl ketone having a boiling point of 104°–105°C/12 mmHg was obtained in a yield of 90%.

What is claimed is:

1. A process for the preparation of a ketone of the formula $R^1COR^2$ which comprises reacting an 8-acyloxyquinoline of the formula $R^1COOC_9H_6N$ with a Grignard reagent of the formula $R^2MgX$, in which $R^1$ is a phenyl group or an aliphatic hydrocarbon group having from 1 to 8 carbon atoms, $R_2$ is selected from the group consisting of a phenyl group, a cyclohexyl group, a cinnamyl group, an aliphatic hydrocarbon group having from 2 to 8 carbon atoms, and X is halogen, at a temperature from 0°C. to about 25°C. in the presence of a solvent selected from the group consisting of diethyl ether, tetrahydrofuran, benzene, toluene, hexane, cyclohexane, dichloroethane and dichloropropane, to form said ketone.

2. A process for the preparation of a ketone according to claim 1 in which both $R^1$ and $R^2$ are saturated aliphatic hydrocarbon radicals.

3. A process for the preparation of a ketone according to claim 1 in which at least one of $R^1$ and $R^2$ is an unsaturated aliphatic hydrocarbon radical.

4. A process for the preparation of a ketone according to claim 1 in which $R^1$ is a methyl radical.

5. The process of claim 1, wherein a reaction product containing said ketone, said solvent and a magnesium complex of said 8-acyloxyquinoline is formed, and wherein said ketone and said solvent are separated from said complex.

6. The process of claim 5, wherein said ketone is then separated from said solvent.

7. The process of claim 1, wherein an excess of said Grignard agent is employed.

* * * * *

UNITED STATES PATENT AND TRADEMARK OFFICE
CERTIFICATE OF CORRECTION

PATENT NO. : 3,895,070
DATED : July 15, 1975
INVENTOR(S) : YUTAKA MORI et al

It is certified that error appears in the above—identified patent and that said Letters Patent are hereby corrected as shown below:

1) First column, under "Assignees": after "Kaisha", insert --- Ltd. ---.

2) Column 2, line 66: after "bromide", delete "and that same mole of" and replace with a comma (--- , ---).

Signed and Sealed this ninth Day of March 1976

[SEAL]

Attest:

RUTH C. MASON
*Attesting Officer*

C. MARSHALL DANN
*Commissioner of Patents and Trademarks*